(No Model.)
2 Sheets—Sheet 1.

O. B. BEACH.
CYCLOMETER.

No. 360,269. Patented Mar. 29, 1887.

Fig. 2ᵃ

Witnesses
J. H. Shumway
Fred O. Earle

Oliver B. Beach
Inventor
By Atty.
John O. Earle (No Model.) 2 Sheets—Sheet 2.
O. B. BEACH.
CYCLOMETER.
No. 360,269. Patented Mar. 29, 1887.
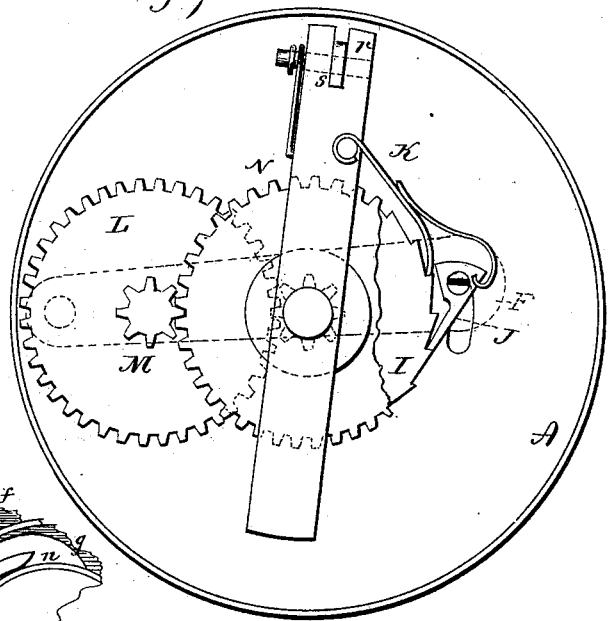
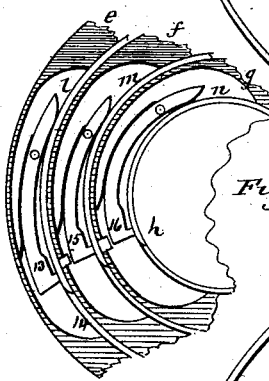
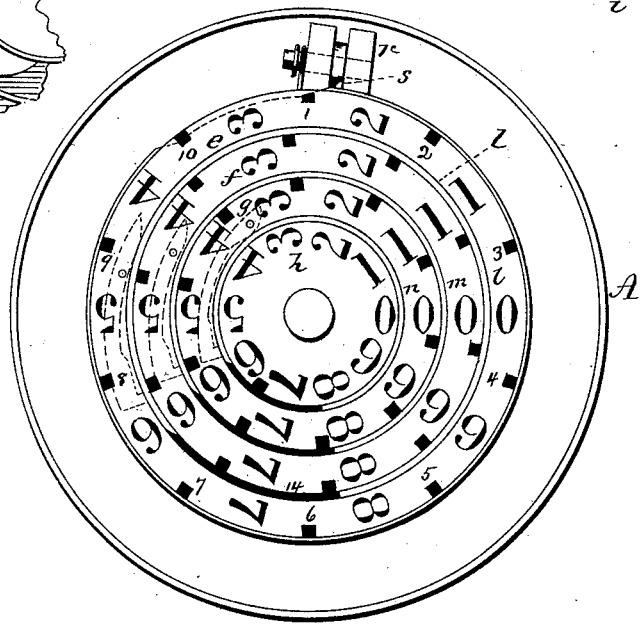
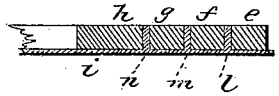
Witnesses:
J. H. Shumway
Fred C. Earle
Oliver B. Beach, Inventor
By Atty. John C. Earle

UNITED STATES PATENT OFFICE.

OLIVER B. BEACH, OF STONY CREEK, CONNECTICUT.

CYCLOMETER.

SPECIFICATION forming part of Letters Patent No. 360,269, dated March 29, 1887.

Application filed November 4, 1886. Serial No. 217,938. (No model.)

*To all whom it may concern:*

Be it known that I, OLIVER B. BEACH, of Stony Creek, in the county of New Haven and State of Connecticut, have invented a new Improvement in Cyclometers; and I do hereby declare the following, when taken in connection with accompanying drawings and the letters of reference marked thereon, to be a full, clear, and exact description of the same, and which said drawings constitute part of this specification, and represent, in—

Figure 1:
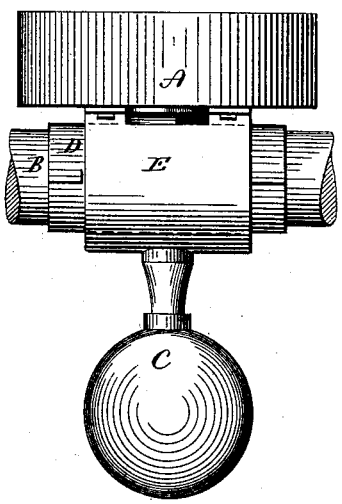
Figure 2:
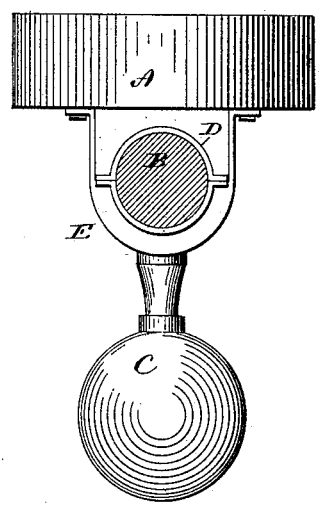
Figure 2:
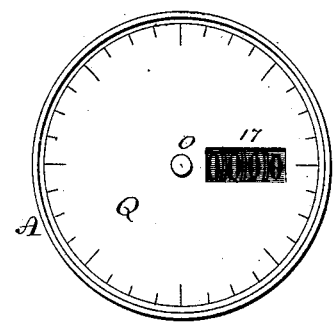
Figure 3:
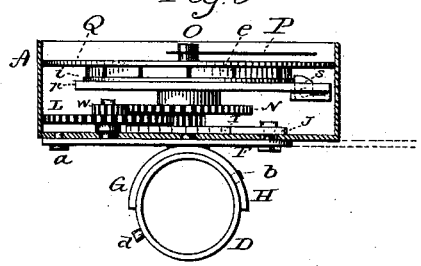
Figure 4:
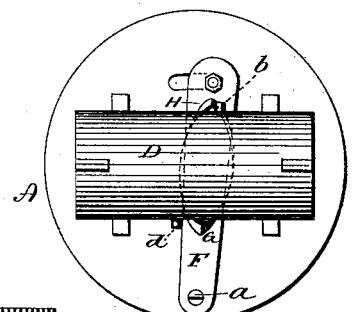
Figure 5:
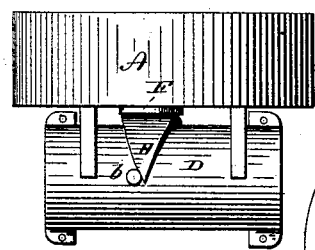
Figure 6:
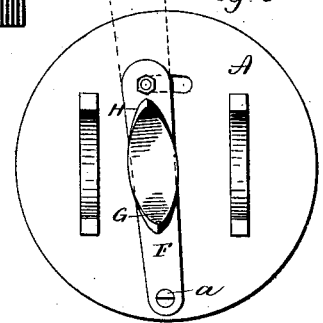
Figure 7:
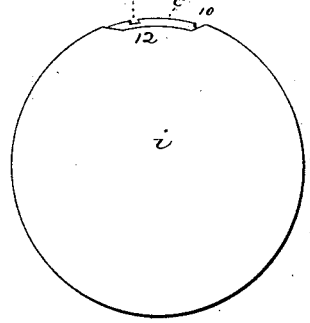

Figure 1, a side view showing the cyclometer as applied to a revolving axle; Fig. 2, an end view, or view at right angles to that seen in Fig 1; Fig. 2ª, a top view showing the dial; Fig. 3, a sectional view showing the mechanism of the case, the socket removed; Fig. 4, an under side view of the parts as seen in Fig. 5; Fig. 5, a side view showing the sleeve and the lever which it operates, the socket removed; Fig. 6, an under side view of the case, the socket and sleeve removed; Fig. 7, an under side view of the plate *i*, showing the recess and the exposed portion of the first ring; Fig. 8, a top view, the dial removed, showing the concentric count-rings; Fig. 9, a top view of the mechanism of the count-rings, the plate removed, showing the actuating mechanism; Fig. 10, a transverse section through a portion of the plate *i*, showing the count-rings and flanges; Fig. 11, a horizontal section through the rings, showing the spring-dogs by which each ring engages the next.

This invention relates to an improvement in the attachment to be applied to bicycles to indicate the distance run by the machine, such distance being measured by the revolution of the wheels, the indicator denoting the number of revolutions made by the wheel, parts of the invention being applicable to registers for other purposes.

The cyclometer is designed to be hung upon the axle of the machine, so that the revolution of the axle will impart the registering movement. To this end it is necessary to hang the cyclometer to the axle, so that it will retain a stationary position while the axle revolves.

A represents the cyclometer-case; B, the axle of the machine, on which the cyclometer is loosely hung, so that it may swing on the axle, and is retained in its upright position by a counter-balance, C, below the axle. (See Figs. 1 and 2.) Upon the axle is a sleeve, D, fixed to the axle, and so as to revolve with it. This sleeve extends through a socket, E, upon the under side of the case A, and to which sleeve the counter-balance C is fixed. This sleeve revolves with the axle within the socket E.

Upon the under side of the case A (see Fig. 6) a lever, F, is hung upon a pivot, *a*, at one side of its center, the lever extending across through the socket above the sleeve D, and upon the under side of the lever two arms, G H, are fixed, which extend down, one each side the sleeve D, as seen in Fig. 3. These arms taper toward their ends to nearly a point, as seen in Figs. 5 and 6, and so as to present oppositely-inclined surfaces circumferentially to the sleeve D.

On the sleeve D two studs or projections, *b d*, are fixed, one each side the central plane through the pivot *a*, on which the lever F is hung, and as seen in Fig. 4, and so that as the sleeve revolves the studs will work, the first upon one side of one arm, G or H, and then the next upon the opposite side, and so that in such revolution of the sleeve D the lever F will be turned first to one side and then to the other, as from the position indicated in Fig. 4 to that in Fig. 6, and return, thus imparting a swinging or vibrating movement to the lever F in the plane of the case. If the sleeve revolve in one direction, then the two studs act upon one arm—say H, as seen in Fig. 5—or if revolved in the opposite direction, then they act upon the other arm, G, so that, in whichever direction the sleeve revolves, the lever F will receive a corresponding vibratory movement. It is from this lever that the registering mechanism receives its movement and the movement is imparted, as seen in Fig. 9.

Upon the inside of the case A is a toothed ratchet, I, into which a pawl, J, works, the said pawl being hung to the free end of the lever F, as clearly seen in Fig. 9, and so that as the lever swings in one direction it will impart rotative movement to the ratchet I, which motion will be caught by a dog, K, the ratchet held, and in the return of the lever F the pawl J will escape, and so as to engage the next tooth, when the lever is again moved forward.

The ratchet-wheel I carries a pinion, which works into a gear, L. The gear L in its turn carries a pinion, M, which works into a gear, N. The proportion of the gears, pinions, and ratchets should, for convenience, be of a decimal character, so that, say, one full revolution of the gear N may be imparted to one hundred or one thousand revolutions of the axle. The shaft O of the gear N extends upward, and is provided with a pointer, P, (see Fig. 3,) which traverses around a dial, Q, the dial being graduated—say as indicated in Fig. 2—that parts of revolution of the gear M may be indicated.

The registering device consists of a series of concentric rings, $e$, $f$, $g$, and $h$. The inner ring, $h$, may be in the form of a disk, as seen in Fig. 8. These rings are arranged concentrically about the shaft O and upon a fixed plate, $i$, beneath the dial Q, as seen in Fig. 3. Between the rings $ef$ is a concentric flange, $l$, fixed to the plate $i$, and between the rings $fg$ is a like fixed concentric flange, $m$, and between the rings $gh$ is a like fixed concentric flange, $n$, the several flanges making concentric grooves, within which the respective rings are arranged, and so that each ring may receive rotation in its own independent groove or channel. The diameter of the plate $i$ is somewhat greater than the external diameter of the ring $e$, as seen in Fig. 7.

Fixed to the shaft O beneath the plate $i$ is an arm, $r$, which revolves beneath the fixed plate $i$ with the shaft O. This arm $r$ extends outside the periphery of the plate $i$, as seen in Fig. 8, and carries a spring-dog, $s$, which rides, under the pressure of the spring, upon the edge of the plate $i$, and extends over the periphery of the first ring, $e$, and as seen in Fig. 3. In the periphery of the ring $e$ are ten notches, 1 2 3 4, &c., equidistant from each other. At one point in the periphery of the plate $i$ there is a recess, 12, (see Fig. 7,) and so that while the dog $s$ will run upon the periphery of the plate $i$ and stand independent of the periphery of the ring $e$, when the dog reaches the recess 12 the periphery of the ring is there exposed, the length of the recess being somewhat greater than one space in the periphery of the ring. As the arm reaches this recess 12 the dog falls and rides upon the periphery of the ring until it engages the first notch—say 1, Fig. 7—and when so engaged with the ring the ring will advance with the arm $r$, say, to the point 10, Fig. 7, and as seen in broken lines, Fig. 8, at which point the end of the recess is reached, and that end is inclined or of a cam-like character, so that the dog advancing from that point will be forced from engagement with the ring out onto the periphery of the plate $i$, and then the arm will continue its travel without engagement with the ring, leaving the ring stationary at the point where it was stopped, and until another revolution of the arm $r$ is completed, when the dog will engage the next notch on the ring $e$ and advance it a second step, as before, and so on, ten revolutions of the arm imparting ten steps, or one full revolution, to the ring $e$. The ring $e$ is in its turn provided with a spring-dog, 13, which rides upon the flange $l$, as does the dog $s$ of the arm $r$ upon the edge of the plate $i$, and until at a certain point, 14, the flange is cut away, so that the dog may drop upon the periphery of the second ring, $f$, and engage one of a like series of ten notches in the periphery of the second ring and advance that second ring one step with the ring $e$. Then the dog again passes onto the flange $l$, as seen in Fig. 11, and is prevented from further engagement with the second ring, $f$, until a full revolution of said ring is made, when engagement will be made with the next notch, and so on. The second ring, $f$, is provided with a like spring-dog, 15, which engages one of the series of ten notches in the third ring, $g$, as seen in Fig. 11, and the third ring, $g$, is provided with a like spring-dog, 16, which engages the next ring or plate, $h$, there being a like recess in each of the intermediate flanges, so as to permit the dog of one ring to engage the periphery of the ring within it at a predetermined time and move it one step in its rotation. These rings may be of any desirable number, four being shown in the illustration. Each ring has a like series of figures, indicating its several steps to ten. The rings all lie and revolve in the same plane, and so that the figures on the successive rings stand in a radial line, as seen in Fig. 8.

At one point through the dial Q is an opening, 17, (see Fig. 2$^a$,) in a radial line, and through which the figures on the several rings at one predetermined point are exposed—say as seen in Fig. 2$^a$, where the four naughts are shown.

During the first revolution of the arm $r$ the outer ring will revolve step by step, presenting first figure 1, then 2, and so on through the units, until a full revolution brings the naught again to the opening, and during the completion of the revolution of the first ring to bring the naught into place the second ring will be engaged, as before described, and present figure 1, thus indicating 10. Then the first ring continues its rotation until the second revolution is completed, when engagement will be again made with the second ring and the figure 2 presented, and so on through the ring of tens. Then the second or tens ring engages the third or hundreds ring and imparts one step to that hundreds-ring, and the hundreds-ring in its turn engages the fourth or thousands ring, and thus continuing until the full count with the four rings, 9,999 steps are indicated, and if these steps each indicate one hundred or one thousand revolutions of the wheel, the calculation is made accordingly and the distance indicated. The divisions on the dial indicate the position of the arm $r$ in its revolution, and the graduations indicate parts of its revolution, and from which calculation may be made accordingly.

By arranging the count-rings in the same plane I am enabled to bring the registering mechanism into a very contracted space, and yet insure a positive working of the same. This registering mechanism, while peculiarly adapted for a cyclometer, may be used for other purposes.

The step-by-step rotation of the ratchet-wheel and second rotation of the arm $r$ may be imparted otherwise than by the mechanism which I have described in connection with the axle—say, for illustration, by extending the lever F, as indicated in broken lines, Figs. 3 and 6, beyond the periphery of the case, so that a projection on the wheel or axle at each revolution may impart a working movement to the lever.

I claim—

1. A cyclometer consisting of the case A, having a socket, E, formed thereon, and provided with a counter-balance, C, combined with a sleeve, D, adapted to be secured to the axle of the machine and so as to revolve therewith, the said sleeve D extending through said socket and so as to revolve therein, a vibrating lever, F, hung to the said case, and with an arm extending therefrom around said sleeve, the edges of the said arm contracting toward its end, so as to present inclined edges, with projections or studs $b\ d$ fixed to said sleeve and so as to revolve therewith, the said studs traveling in a path upon opposite sides of said arm, and a registering mechanism in connection with said arm, substantially as described, and whereby each vibration of said arm imparts one step in the registering mechanism.

2. In a registering mechanism, the combination of two or more concentric rings, a concentric plate upon which said rings are arranged, the periphery of the plate corresponding to or somewhat larger than the periphery of the outer ring, a concentric flange fixed to said plate and between said rings, the said rings having upon their face a series of figures and constructed upon their periphery with a series of notches corresponding to said series of figures, the said concentric flange and the edge of the plate cut away at one point for a distance greater than the distance between the said notches in the rings, a spring-dog hung in the outer ring and so that its nose may travel upon the said flange, but so as to escape from the said flange at the said recess in the flange and engage a corresponding notch in the second ring, an arm arranged to revolve concentric with said plate and ring, a spring-dog in said arm adapted to travel upon the periphery of said plate and so as to engage a notch in the outer ring at the said recess in the periphery of the plate, with mechanism, substantially such as described, to impart a step-by-step rotation to said arm, all substantially as described.

3. The combination of the case A, having a socket, E, and counter-balance C, attached to or made a part thereof, the sleeve D in said socket, free for revolution therein and adapted to be fixed to a revolving axle, the lever F, hung to said case and constructed with the arms G H, studs $b\ d$ on said sleeve, ratchet-wheel I, pawl J on said lever F, arranged to engage said ratchet, arm $r$, with intermediate gearing between it and said ratchet, fixed concentric plate $i$, two or more concentric rings, $e, f$, &c., on said plate, the said plate constructed with a fixed concentric flange between said rings, each of said rings having upon its face a series of figures and each ring constructed with a series of notches in its periphery corresponding to said series of figures, the periphery of the said plate and each of the said concentric flanges constructed with a recess at one point, a spring-dog, $s$, hung in said arm $r$, adapted to engage a notch in the outer ring at the recess in the periphery of the plate, a dog in each of the rings adapted to engage a notch in the periphery of the next inner ring at the said recess in the flange separating the said rings, with a dial over said rings and having a radial opening therein exposing one of the figures on each of said rings, substantially as described.

OLIVER B. BEACH.

Witnesses:
J. H. SHUMWAY,
LILLIAN D. KELSEY.